May 28, 1957

C. L. ROBINSON 2,793,710

HEAT EXCHANGER

Filed June 28, 1955

INVENTOR
Claude L. Robinson
BY Thos. E. Scofield
ATTORNEY.

May 28, 1957

C. L. ROBINSON 2,793,710

HEAT EXCHANGER

Filed June 28, 1955

INVENTOR.
Claude L. Robinson

United States Patent Office 2,793,710
Patented May 28, 1957

2,793,710
HEAT EXCHANGER
Claude L. Robinson, Kansas City, Mo.
Application June 28, 1955, Serial No. 518,564
11 Claims. (Cl. 183—26)

This invention relates to devices for achieving heat transfer between liquids and gases and refers more particularly to such an apparatus wherein the liquid and gas to be heat transferred are entrained together in a common fluid flow, the entrained fluid is then distributed and subdivided over a plurality of barriers to permit intimate heat transferring contact with the gas and, finally, the heat transferred fluid and gas are separated and individually aggregated.

An object of the present invention is to provide an apparatus for heat transferring liquids and gases wherein such heat transfer is accomplished more efficiently, at more rapid rates, and in a more compact space than in presently available devices of this sort.

Another object of the invention is to provide an apparatus for heat transferring fluids and gases which includes means to very finely subdivide the fluid to be heat transferred so as to permit a more intimate contact of the heat transferring gas therewith.

Another object of the present invention is to provide an apparatus for heat transferring fluids and gases wherein very fine subdivision of the fluid to be heat transferred is provided by impact with and passage through horizontal louvers of rotating screens thereby providing a multitude of air spaces between the fluid quantities to further the diffusion of the liquid in the gas to render it more susceptible to loss or gain of heat content.

Another object of the present invention is to provide apparatus for heat transferring fluids and gases wherein a combination of centrifugal force and air pressure is employed to move the fluid to be heat transferred through a plurality of fluid mixing and subdividing horizontal louver blades whereby to permit very intimate mixing of the fluid and gas to be heat transferred.

Still another object of the present invention is to provide apparatus for the heat transferring of fluids and gases employing a combination of horizontal impeller blades and rotating screen louver blades to subdivide and mix the fluid and gas to be heat transferred and a louvered screen having vertical louver blades therein to separate the heat transferred fluid and gas and collect and drain off the fluid while permitting the passage of air therethrough.

Other objects will appear in the course of the following description of the invention.

In the drawings, which form a part of the instant specification and are to be read in conjunction therewith, embodiments of the invention are shown and, in the various views, like numerals are employed to indicate like parts.

Figures 1, 2:
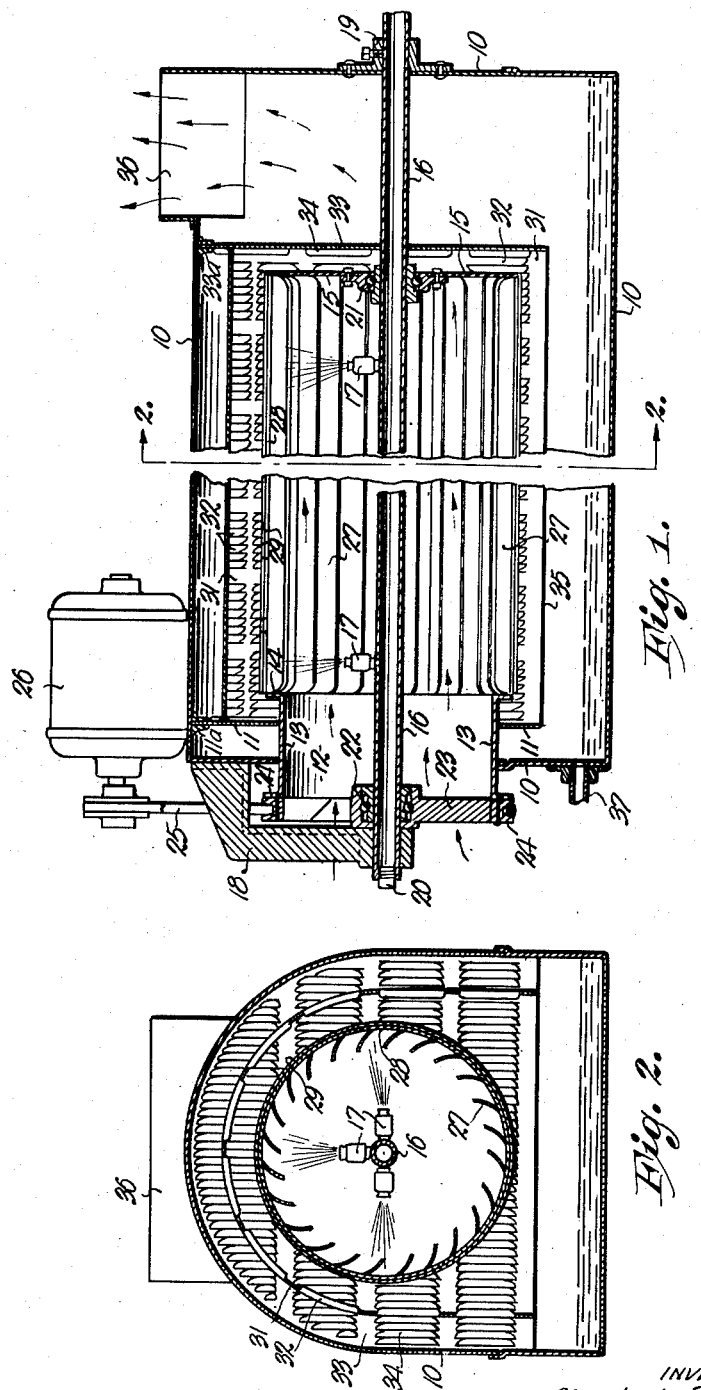
Fig. 1 is a side sectional view of an apparatus for heat transferring fluids and gases embodying the invention.
Fig. 2 is a view taken along the lines 2—2 of Fig. 1.
Figure 3:
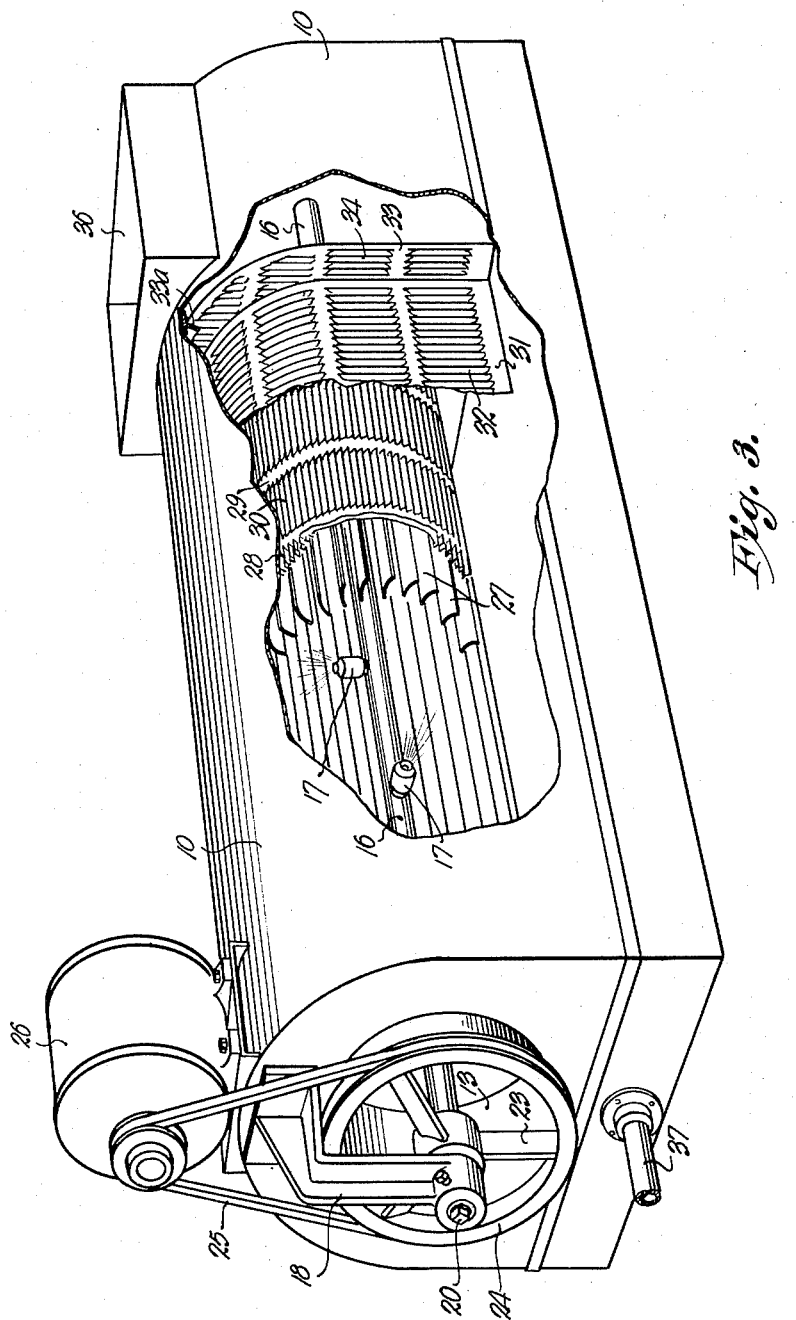
Fig. 3 is a three-quarter perspective view of the apparatus of Fig. 1 with parts in section and cut away.

Referring to the drawings, the numeral 10 refers to the outer enclosing housing which is liquid and air-tight except for inlet and outlet openings. A louvered chamber is enclosed within said housing 10. Louvered walls 11 and 33 are suspended from the ceiling of housing 10 by attachments 11a and 33a. Wall 31 is attached to walls 11 and 33. A rotatable cylindrical air passage 12 having wall 13 penetrates housing 10 and louvered chamber wall 11 and is mounted preferably axially to said housing and chamber. A rotatable cylinder 14 fixed to rotatable passageway wall 13 is mounted in said chamber axially relative air passage 12 and preferably has an internal diameter equal to or greater than said passage. The end of cylinder 14 next passage 12 is open to permit flow of air from the passageway therethrough and the end opposite the passageway has water and air-tight wall 15 therein to prevent any flow therethrough. Means to transmit fluid to be heat transferred into said cylinder 14 and the chamber comprise stationary hollow shaft 16 having a plurality of spray nozzles 17 mounted thereon. Spray nozzles 17 preferably are mounted to spray a 180° arc of the chamber as shown. Shaft 16 is axially mounted relative housing 10, the chamber, cylinder 14 and passageway 12 and is received at the passageway end of the housing in angle support 18 and at the opposite end in water-tight fitting 19. The passageway 12 end of shaft 16 has plug 20 therein. Rotation mounting 21 rotatably connects cylinder end wall 15 and shaft 16 and rotation mounting 22 connects passageway wall 13 and shaft 16 through spokes 23. Spokes 23 are blade shaped and angled to force air into passageway 12 and cylinder 14. Drive ring 24 on the outside of passage wall 13 is engaged by drive belt 25 from power source 26. Application of power to drive ring 24 through drive belt 25 rotates interconnected passage wall 13 and cylinder 14 on shaft 16. Impeller fan blades 27 are axially mounted between the ends of the cylinder at their perimeter and form the external and the internal surfaces of said cylinder 14. Blades 27 serve, when the cylinder is rotated to create (with spokes 23) air flow into passage 12 and the cylinder 14, to receive fluid to be heat transferred in subdivided form from nozzles 17 and mix and drive said air and fluid concurrently outwardly. Axial screens 28 and 29, having horizontal or axial louver blades 30 thereon with gaps or interstices therebetween, are rotatably mounted on cylinder 14 concentric thereto. One or more screens 28 may be employed, a mounting of two (28 and 29) being shown here. The blades 30 preferably slant in the same direction as impeller blades 27 to aid in producing the air flow. Said screens 28 and 29 are mounted so as not to contact the blades 27 of the cylinder nor contact each other. Screens 28 and 29 and louver blades 30 serve as means for entraining, further subdividing and mixing with the intake air the quantities of fluid received from the surfaces and blades 27 of cylinder 14. The walls 31 of the chamber axial to cylinder 14 comprise an outer screen having a plurality of essentially radial louvers 32. The end walls 33 and 11 of the chamber next the cylinder wall 15 have essentially vertical louvers 34 therein. Wall 33 is suspended from the ceiling of housing 10 by attachment 33a. Walls 11, 31 and 33 and louvers 32 and 34 serve as means for condensing and collecting the air entrained heat transferred fluid and transmitting it down to a sump (lower part of housing 10) while permitting the passage of the heat transferred air therethrough. The louvered chamber has no floor. Air exhaust outlet 36 is preferably positioned in the ceiling of housing 10 past end wall 33 of the chamber. The ceilings of the housing and the chamber are preferably concentric to the circumference of cylinder 14 as shown in Fig. 2. Sump drain 37 (Fig. 3) removes the heat transferred fluid from the bottom of housing 10 for recirculation thereof, if desired.

Figure 4:
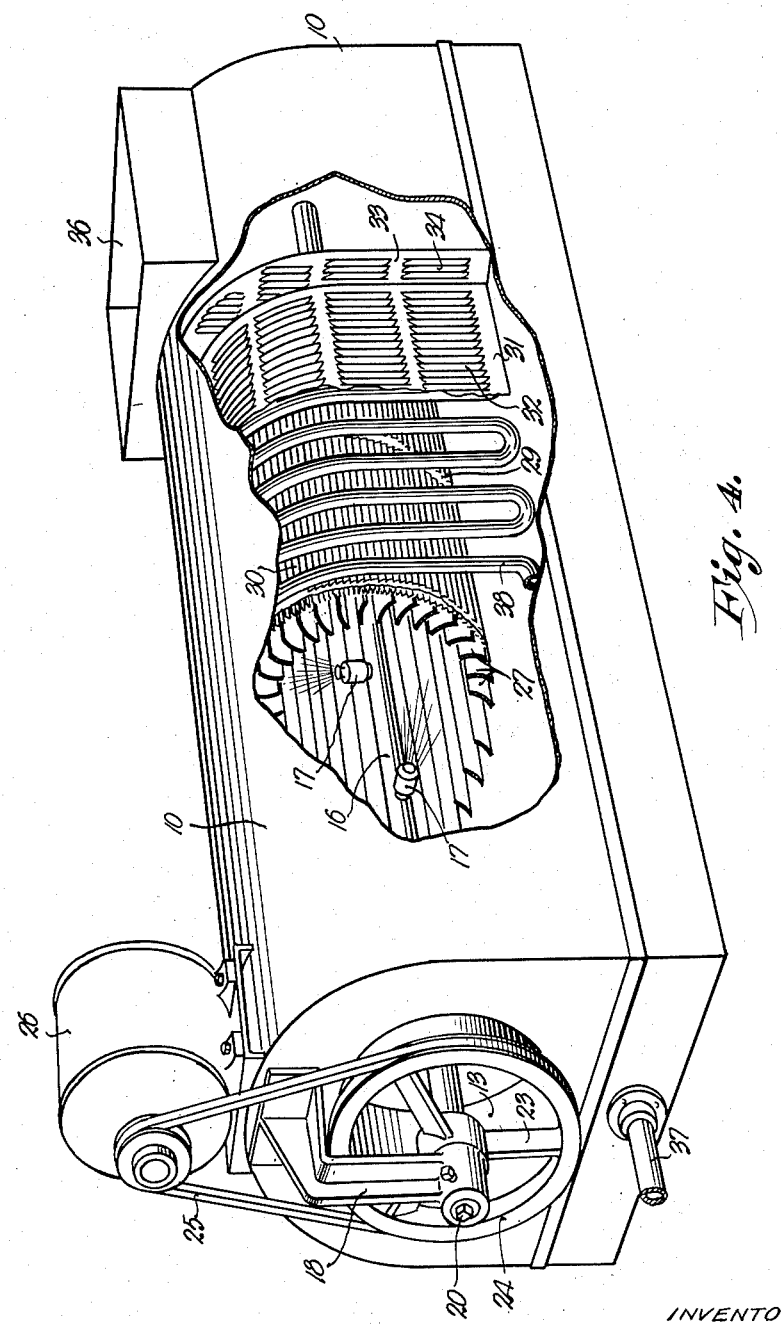
Fig. 4 is a three-quarter perspective view of a modified form of the apparatus of Fig. 1 with parts in section and cut away.

A modification of the inventive apparatus is shown in Fig. 4. This structure differs from that previously described in that coil 38 is interposed between outer screen 29 and axial chamber walls 31. This installation may serve two purposes depending on the temperature of the fluid or gas in the coil relative the temperature of the vapor fog circulating between the screens 28 and 29 and the chamber walls 31. If the coil temperature is lower than that of the fog then the air and water elements of the fog will both be chilled and the coil fluids will take up heat. If the coil temperature is greater than that of the fog the coil fluids will lose heat to the vapor fog elements. Such a coil element may be connected as desired into another heating or cooling system.

In operation, the interconnected passage wall 13 and cylinder 14 unit are rotated around shaft 16 under impetus of drive belt 25. A flow of air is created into passage 12 and cylinder 14 by spokes 23, impeller blades 27 and screen axial louvers 30. The air flows into chamber 14 and then, because of the radial action of blades 27 and louvers 30 and the blocking cylinder end wall 15, is drawn out through louvers 30 and finally forced out through radial louvers 32 in axial chamber walls 31 and vertical louvers 34 in vertical chamber end walls 11 and 33 into the exhaust chamber formed by housing 10 and the outside of the chamber. This air is then removed through outlet 36.

Into this established air flow, fluid to be heat transferred is discharged by spray nozzles 17 on conduit 16 to distribute the fluid in a dispersed spray in the cylinder. The incoming air stream and the spray of liquid from the nozzles are simultaneously propelled outwardly by the impeller blades in all directions from the periphery of the cylinder in an advanced stage of vaporization. Almost complete vaporization of the liquid is attained by impact with the passage through the small and closely spaced louvers 30 of encircling screens 28 and 29 mounted in one or more layers around the perimeter of cylinder 14. The interstices of the louvered screens afford additional air spaces in which to further the diffusion of the liquid in the air, thus rendering it more susceptible to the loss of its heat content. The louver apertures 30 in the screens 28 and 29 are of such dimensions and are so numerous that they present a greatly multiplied surface tension area which normally will hold in their interstices a virtual film of water. The centrifugal force generated by the revolving cylinder is combined with the force of the air impelled by the blades 27 of cylinder 14 to not only convert the sprayed liquid into fog-like vapor but also to keep it moving on through the louvers 30 of the revolving screens 28 and 29 to a stage where the vapor can be entrained and formed again into liquid which has yielded to or gained from the air excess heat content. The fog-like vapor expelled from the air and water mixing screens 28 and 29 is for the most part entrained within the louvered apertures of chamber walls 11, 31 and 33 surrounding the cylinder 14. The vapor collects in the vertical louver 34 interstices forming a film of water with the aid of surface tension. The force of gravity overbalances the surface tension force as the film of water accumulates and the vertical louvers form channels down which the formed water trickles into the collection zone for recirculation.

From the foregoing it will be seen that this invention is one well adapted to attain all of the ends and objects hereinabove set forth together with other advantages which are obvious and which are inherent to the method structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. Apparatus for achieving efficient heat transference of fluids comprising an outer enclosing housing, a chamber enclosed within said housing, a shaft extending axially through said housing and chamber and piercing the end walls of said chamber, a walled air passage mounted circumferentially to said shaft and rotatable within said housing and piercing one end wall of the housing and chamber, a rotatable cylinder positioned axially entirely in said chamber and mounted circumferentially to said drive shaft and rotatable relative said housing, means for rotating the passage and cylinder relative the housing, the end of said cylinder adjacent the inner end of said passageway being sealed except opposite the open portion of the passageway, the other end of the cylinder being opposite the passageway and closed to block air flow therethrough, means within said cylinder to distribute fluid to be heat transferred on the axial length of said cylinder, means forming the inner axial periphery of said cylinder for creating air flow into said passageway and cylinder and for receiving said fluid to be heat transferred and mix and drive said air and fluid concurrently outwardly, additional means forming the outer axial periphery of said cylinder for entraining and further subdividing fluid quantities received from the interior of said cylinder, means in the walls of said chamber for collecting said heat transferred fluid and transmitting it down to a sump while permitting passage of air therethrough, and an air outlet in said housing past the wall of the chamber next the solid end of said cylinder.

2. Apparatus as in claim 1 wherein the passage and cylinder rotating means are positioned outside said chamber and said housing.

3. Apparatus as in claim 1 wherein one end of said passageway and one end of said cylinder are connected together whereby air flowing through said passageway passes only into said cylinder.

4. Apparatus as in claim 1 wherein the inner diameter of said passageway is substantially equal to the inner diameter of said cylinder.

5. Apparatus as in claim 1 wherein one end of said passageway and one end of said cylinder are connected together and the inner diameter of said passageway is substantially equal to the inner diameter of the said cylinder whereby any air passing through said passageway goes into said cylinder.

6. Apparatus as in claim 1 wherein said cylinder is substantially the length of said chamber.

7. Apparatus as in claim 1 including means in the walled passageway to aid in creating flow of air into and through said passageway.

8. Apparatus as in claim 1 wherein said shaft comprises the flow line for the input of fluid to be heat transferred into said cylinder.

9. Apparatus as in claim 1 wherein the means forming the inner axial periphery of the cylinder comprise a plurality of angled impeller blades, the means forming the outer axial periphery of the cylinder comprise a screen of axial louver blades.

10. Apparatus as in claim 9 wherein the axial louver blades comprising the axial periphery of the cylinder are angled in the same direction as the cylinder impeller blades whereby to act as air impellers supplementing the force of the cylinder impeller blades.

11. Apparatus as in claim 9 wherein the means in the walls of the chamber for collecting heat transferred fluid comprise essentially radially positioned bladed louvers, the wall of the chamber next the closed end of the cylinder having louver blades essentially vertical in orientation therein.

References Cited in the file of this patent

UNITED STATES PATENTS

| | | |
|---|---|---|
| 2,012,608 | Landerman | Aug. 27, 1935 |
| 2,106,325 | Kummer | Jan. 25, 1938 |
| 2,254,213 | Feldman | Sept. 2, 1941 |
| 2,313,546 | Hickman | Mar. 9, 1943 |
| 2,698,745 | Boucher | Jan. 4, 1955 |